April 10, 1934.  J. C. PARKINSON  1,954,058
DOUBLE GLAZING
Filed July 20, 1932
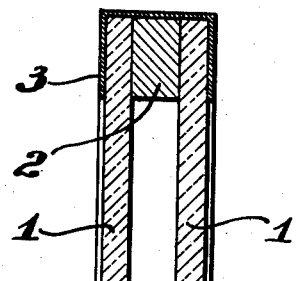
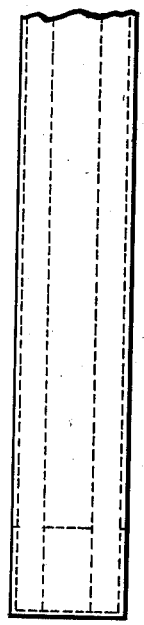
INVENTOR
J. Carl Parkinson
by Bradley Lee
attys Patented Apr. 10, 1934

1,954,058

UNITED STATES PATENT OFFICE 1,954,058

DOUBLE GLAZING

Joseph Carl Parkinson, Tarentum, Pa., assignor to Pittsburgh Plate Glass Company, a corporation of Pennsylvania Application July 20, 1932, Serial No. 623,484

9 Claims. (Cl. 20—56.5)

The invention relates to double glazing, in which two sheets of glass are used in parallel for insulating purposes either in buildings or refrigerators. When ordinary polished plate glass or window glass sheets are used in structures of this kind, a white alkaline dust forms in the course of time on the interior surfaces of the glass plates unless provision is made for a free circulation of air through the space between the sheets, and such dust clouds the sheets so that their transparency is impaired. The circulation of air between the sheets involves certain complications, and reduces the efficiency of the insulation. The object of the present invention is to provide a construction which requires very little, if any, circulation of air between the sheets, and which avoids the formation of the objectionable dust referred to. This dust is formed from the substance of the glass itself and I have found that by the use of proper batch materials, this difficulty may be overcome, and a glass produced which is of reasonable cost, and which has the same strength and hardness as ordinary lime soda plate and window glass. A conventional double window or refrigerator pane is shown in the accompanying drawing, wherein:

The figure is a partial section, 1, 1 being the two sheets of glass; 2 a spacer between the plates at their edges; and 3 a suitable clip for securing the sheets together. It will be understood in this connection that the present invention has nothing to do with the particular means for holding the glass sheets in assembled relation.

Two typical glass formulas which may be satisfactorily used to make the glass sheets 1, 1 are as follows:

FORMULA I

| Batch formula | Parts | Glass composition | Per cent |
|---|---|---|---|
| Sand | 1000 | $SiO_2$ | 71.28 |
| Soda ash | 160 | $Na_2O$ | 8.48 |
| Potassium carbonate | 160 | $K_2O$ | 6.34 |
| Limestone | 310 | $CaO$ | 12.12 |
| Salt cake | 60 | $Na_2SO_4$ | .71 |
| Common salt | 25 | $NaCl$ | .72 |
| Arsenic | 5 | $As_2O_3$ | .35 |
| Coal | 3 | | |

FORMULA II

| Batch formula | Parts | Glass composition | Per cent |
|---|---|---|---|
| Sand | 1000 | $SiO_2$ | 71.31 |
| Soda ash | 196 | $Na_2O$ | 8.10 |
| Potassium carbonate | 99 | $K_2O$ | 6.34 |
| Potassium nitrate | 73 | | |
| Limestone | 292 | $CaO$ | 11.42 |
| Salt cake | 11 | $Na_2SO_4$ | .98 |
| Aluminum hydrate | 21 | $Al_2O_3$ | .78 |
| Antimony oxide | 15 | $Sb_2O_3$ | 1.07 |

Formula I is a standard lime soda glass batch except that the alkali content is made up of half soda ash and half potassium carbonate (potash) instead of all soda ash; and Formula II is also a standard lime soda glass batch except that the alkali content is made up of one half soda ash and one half a mixture of potassium carbonate and potassium nitrate instead of all soda ash. I have found that the substitution of a part of the soda ash by a potassium salt gives a product in which the formation of the objectionable dust or "efflorescence", as it is sometimes called, is practically negligible, so that double glazed panes of this glass will remain perfectly transparent throughout their period of use. The proportion of the potassium salt may be varied, it being desirable, however, to keep the amount as low as possible, because of the greater cost of the potassium salt as compared with the soda ash. While the amount of the potassium salt used in the batch is preferably such as to give a potassium oxide content in the glass of a little over 6 per cent, this amount may be reduced, so that the oxide runs as low as 2 per cent, and still secure fairly satisfactory results in preventing efflorescence.

Aside from its somewhat greater cost, the improved glass is as satisfactory in all particulars, including the matters of strength and hardness, as the ordinary lime soda window or plate glass. By "lime soda" is meant glass in which the proportion of lime to soda is not less than 1 to 2 by weight. While the lime content (CaO) in the batch is much preferred because of its cheapness and the superior quality of the glass incident to its use, it is possible to replace such content in part or in whole with the oxides of magnesium, zinc, barium or lead, as the potassium content will perform the same function in reducing efflorescence in the glasses so produced, as in the lime soda glass. By "high silica glass" is meant a glass containing at least 50 per cent of $SiO_2$.

What I claim is:

1. A double glazed window, comprising a pair of spaced sheets of high silica glass secured together at the edges to provide an insulating space therebetween said glass sheets having a content of potassium oxide of at least 2 per cent by weight.

2. A double glazed window, comprising a pair of spaced sheets of high silica glass secured together at the edges to provide an insulating space therebetween said glass sheets having a content of potassium oxide of from 2 to 10 per cent by weight.

3. A double glazed window, comprising a pair of spaced sheets of high silica glass secured together at the edges to provide an insulating space therebetween said glass sheets, being made from a batch in which a substantial part of the alkali content is a potassium salt.

4. A double glazed window, comprising a pair of spaced sheets of high silica lime soda glass secured together at the edges to provide an insulating air space therebetween, said glass sheets having a content of potassium oxide of at least 2 per cent.

5. A double glazed window, comprising a pair of spaced sheets of high silica lime soda glass secured together at the edges to provide an insulating air space therebetween, said glass sheets having a content of potassium oxide of from 2 to 10 per cent by weight.

6. A double glazed window, comprising a pair of spaced sheets of high silica lime soda glass secured together at the edges to provide an insulating air space therebetween, said glass sheets having a content of potassium oxide of about 6 per cent by weight.

7. A double glazed window, comprising a pair of spaced sheets of high silica lime soda glass secured together at the edges to provide an insulating air space therebetween said glass sheets being made from a batch in which a substantial part of the alkali content is a potassium salt.

8. A double glazed window, comprising a pair of spaced sheets of high silica lime soda glass secured together at the edges to provide an insulating air space therebetween, said glass sheets being made from a batch in which a substantial part of the alkali content is potash.

9. A double glazed window, comprising a pair of spaced sheets of high silica lime soda glass secured together at the edges to provide an insulating air space therebetween, said glass sheets being made from a batch in which a substantial part of the alkali content is potassium nitrate.

J. CARL PARKINSON.